J. P. Clement,

Wind Mill.

No. 109,496.   Patented Nov. 22, 1870.

Section thro' a.b

Witnesses.   Inventor
              John P. Clement

United States Patent Office.

JOHN P. CLEMENT, OF GRINNELL, IOWA.

Letters Patent No. 109,496, dated November 22, 1870.

IMPROVEMENT IN WIND-MILLS.

*The Schedule referred to in these Letters Patent and making part of the same.*

*To all whom it may concern:*

Be it known that I, JOHN P. CLEMENT, of Grinnell, in the county of Poweshiek and in the State of Iowa, have invented certain new and useful Improvements in Wind-Mills; and do hereby declare that the following is a full, clear, and exact description thereof, reference being had to the accompanying drawing and to the letters of reference marked thereon making a part of this specification.

The nature of my invention consists in the construction and arrangement of a device for changing the position of the fans in a wind-mill automatically, according to the force of the wind, making them self-regulating, so as to run the machinery at all times with the same speed.

In order to enable others skilled in the art to which my invention appertains to make and use the same, I will now proceed to describe its construction and operation, referring to the annexed drawing, in which—

Figure 1:
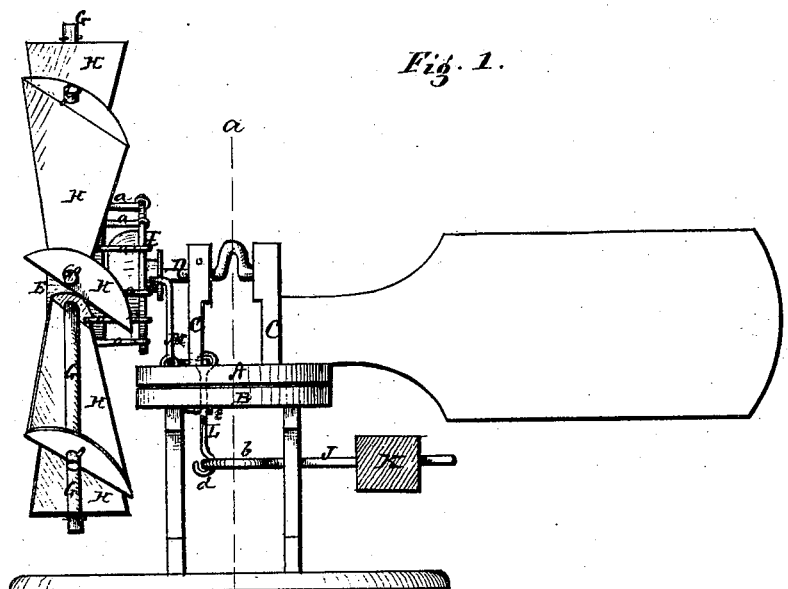

Figure 1 is a side elevation, and

Figure 2:
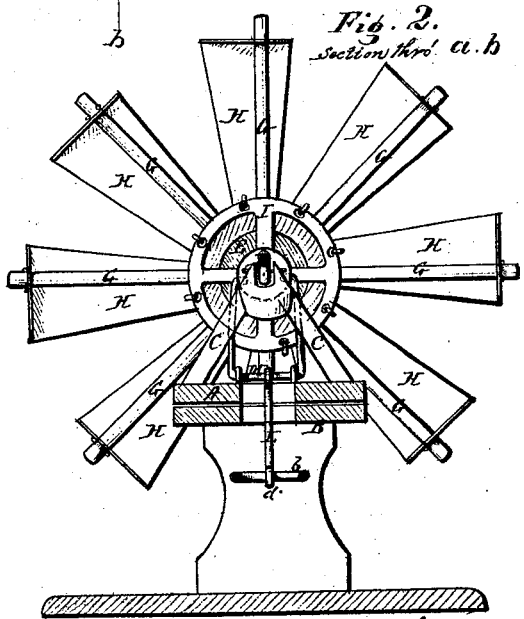

Figure 2, a vertical section through line *a b*, fig. 1, of my machine.

A represents the circular base, which is to revolve upon the stand B.

On the circular base A are standards C C, forming bearings for the crank-shaft D, upon the outer end of which is secured the wheel E, This wheel is provided with arms G G, upon which the fans H H are hinged or otherwise pivoted.

The fans are not hung upon the arms G G in their centers, but they are wider on one side of the arms than on the other side, and at their inner ends on the wider sides they are connected by rods *a a* with a wheel, I, which is placed upon the shaft D, revolving with it, but capable of being moved out or in on the same.

In the stand B is pivoted a lever, J, the inner end of which is shaped as a ring, *b*, and the outer end provided with an adjustable weight, K.

A hook, *d*, upon the lower end of a vertical rod, L, embraces the ring *b* of the lever J, said rod passing upward through a guide, *e*, attached to the circular base A, and its upper end is attached to a lever, M, which is forked, and the two arms pivoted on the upper side of the base A, their ends passing into a groove on the hub of the wheel I.

The fans being wider on one side of the arms than on the other, causes the greater force of the wind to be upon the wider side of the fans, which has a tendency to turn them inwardly.

By their tendency to turn inwardly, they crowd against the wheel I, through the connecting-rods *a a*.

This causes the wheel I to slide upon the shaft D, and react against the pronged or forked lever M. This lever reacts through the perpendicular rod L, and down upon the ring *b* of the horizontal lever J, depressing or lowering the ring and elevating the outer end, with the weight K upon it.

By means of this weight the fans can be set with any desired force against the wind according to the power wanted, and when the wind exceeds the force of the fans or the power of the weight below, the weight will be overcome, and will rise and let the fans turn inwardly, and the wind escape without increasing the velocity of the machinery.

When the wind lulls the weight will fall, turning the fans outwardly, presenting more surface to the wind, and keep up the velocity, and thus it becomes a self-regulator, adapting itself to every variation of the wind.

The machine is stopped by lifting up upon the weighted lever, which slides the wheel I back upon the shaft and turns the fans edgewise to the wind.

The weighted lever must be fastened in position when the machine is at rest or disconnected from the perpendicular rod L.

It is, of course, understood that the machine is calculated to turn upon the stand with every change of wind.

The connecting-rod or pitman, that is to work upon the crank of the shaft D, must extend down through and have its lower connection below the ring *b* of the horizontal lever J, for, as the perpendicular rod L, that connects with said ring, is hung on one side of the center at the top, it will describe a circle as the machine turns upon the stand, and as the pitman on the crank is in the center, its position will be in the center of motion all the time, while the rod at its side will describe a circle around it.

The ring *b*, with which said perpendicular rod connects, gives a chance to make the connection any where on the circle as the wind changes.

The weighted lever J must have a perfect bearing or fulcrum, so as to sustain a sidewise force when the connection is at one side.

The weight K must be moved upon the lever to correspond with the place of connection upon the ring.

In a large machine the connection with the ring is by means of two friction-rollers, which enables the perpendicular rod to change position easily upon the ring as the wind changes.

Having thus fully described my invention,

What I claim as new, and desire to secure by Letters Patent, is—

The fans H H, placed upon the arms G G, as described, and connected with the sliding wheel I by means of the rods $a\ a$, regulated by means of the weighted lever J, connected with said wheel I by the rod L and lever M, substantially as herein set forth.

In testimony that I claim the foregoing I have hereunto set my hand this 26th day of April, 1870.

JOHN P. CLEMENT.

Witnesses:
    CHARLES H. SPENCER,
    W. S. LEISNER.